United States Patent [19]

Bansal

[11] Patent Number: 5,281,559
[45] Date of Patent: Jan. 25, 1994

[54] METHOD OF PRODUCING A CERAMIC FIBER-REINFORCED GLASS-CERAMIC MATRIX COMPOSITE

[75] Inventor: Narottam P. Bansal, No. Olmsted, Ohio

[73] Assignee: The United States of America as represented by the Administrator of the National Aeronautics and Space Administration, Washington, D.C.

[21] Appl. No.: 84,058

[22] Filed: Jun. 30, 1993

Related U.S. Application Data

[63] Continuation-in-part of Ser. No. 872,262, Apr. 16, 1992.

[51] Int. Cl.$^5$ .................. C03C 10/06; C03C 14/00
[52] U.S. Cl. .................................... 501/8; 501/32; 501/95; 264/58
[58] Field of Search .................. 501/8, 32, 73, 95; 264/58

[56] References Cited

U.S. PATENT DOCUMENTS

| | | | |
|---|---|---|---|
| 3,985,532 | 10/1976 | Grossman | 65/33 |
| 4,589,900 | 5/1986 | Brennan et al. | 65/33 |
| 4,755,489 | 7/1988 | Chyung et al. | 501/8 |
| 4,973,564 | 11/1990 | Chyung et al. | 501/32 |
| 5,132,256 | 7/1992 | Beall et al. | 501/95 |
| 5,164,341 | 11/1992 | Chyung | 501/8 |
| 5,214,004 | 5/1993 | Bansal | 501/8 |

*Primary Examiner*—Karl Group
*Attorney, Agent, or Firm*—Gene E. Shook; Guy M. Miller; James A. Mackin

[57] ABSTRACT

A fiber-reinforced composite composed of a $BaO—Al_2O_3—2SiO_2$ (BAS) glass ceramic matrix is reinforced with CVD silicon carbide continuous fibers. A slurry of BAS glass powders is prepared and celsian seeds are added during ball melting. The slurry is cast into tapes which are cut to the proper size.

Continuous CVD-SiC fibers are formed into mats of the desired size. The matrix tapes and the fiber mats are alternately stacked in the proper orientation. This tape-mat stack is warm pressed to produce a "green" composite.

The "green" composite is then heated to an elevated temperature to burn out organic constituents. The remaining interim material is then hot pressed to form a silicon carbide fiber-reinforced celsian (BAS) glass-ceramic matrix composite which may be machined to size.

20 Claims, 1 Drawing Sheet

METHOD OF PRODUCING A CERAMIC FIBER-REINFORCED GLASS-CERAMIC MATRIX COMPOSITE

ORIGIN OF THE INVENTION

The invention described herein was made by an employee of the U.S. Government and may be manufactured or used by or for the Government without the payment of any royalties thereon or therefor.

STATEMENT OF COPENDENCY

This application is a continuation-in-part of application Ser. No. 07/872,262 which was filed Apr. 16, 1992.

TECHNICAL FIELD

This invention is concerned with producing a ceramic fiber-reinforced glass-ceramic matrix composite. The invention is particularly concerned with a method of making a high strength ceramic fiber reinforced composite which is refractory, strong, and tough for applications as high temperature structural materials.

It has been suggested that lithium aluminosilicate, magnesium aluminosilicate (cordierite), and calcium alumino-silicate glass ceramics reinforced with SiC fibers derived from polymers be used for such applications. Commercially available SiC fibers, known as Nicalon, have been satisfactory. However, the potential use of such prior art materials is limited to somewhat low temperatures of about 1000° C. to 1100° C.

It is, therefore, an object of the present invention to produce a new composite material having superior mechanical properties at high temperatures.

Another object of the invention is to provide a method of making a ceramic fiber-reinforced glass-ceramic matrix composite material for use in gas turbine and diesel engines.

BACKGROUND ART

U.S. Pat. No. 3,985,532 to Grossman is directed to spontaneously formed celsian glass-ceramics. U.S. Pat. No. 4,589,900 to Brennan et al is concerned with a high strength thermally stable magnesium alumino silicate glass-ceramic matrix SiC fiber composite. This patent describes a means of producing $(BaO-MgO).Al_2O_3$-$SiO_2$ composite materials where a tape is formed on a drum, then cut into tapes which are used in a later process to build assemblies of different fiber orientations.

U.S. Pat. No. 4,755,489 to Chyung et al is concerned with reinforced calcium aluminosilicate glass-ceramics. U.S. Pat. No. 4,973,564 which likewise issued to Chyung et al is directed to bonding frits for ceramic composites.

DISCLOSURE OF THE INVENTION

The objects of the invention are achieved with a fiber- reinforced composite which is composed of a $BaO-Al_2O_3-2SiO_2$(BAS) glass ceramic matrix that has been reinforced with CVD SiC continuous fibers. The method of assembly includes preparing a slurry of BAS glass powders and adding −325 mesh celsian seeds having a $BaAl_2Si_2O_8$. (40.9 w/o BaO, 27.1 w/o $Al_2O_3$, and 32.0 w/o $SiO_2$) composition to the slurry during ball milling. The slurry is cast into tapes. After the tapes are dried they are cut to the proper size.

Continuous CVD-SiC fibers are formed into mats of the desired size. The matrix tapes and the fiber mats are alternately stacked in the proper orientation. This tape-mat stack is warm pressed to produce a "green" composite.

The "green" composite is then heated to an elevated temperature to burn out organic constituents. The remaining interim material is then hot pressed to form a BAS glass-ceramic fiber reinforced composite which may be machined to size.

DESCRIPTION OF THE DRAWING

The objects, advantages and novel features of the invention will be more fully apparent from the following detailed description when read in conjunction with the accompanying drawings wherein like numerals are used throughout to identify like parts.

BEST MODE FOR CARRYING OUT THE INVENTION

Figure 1:
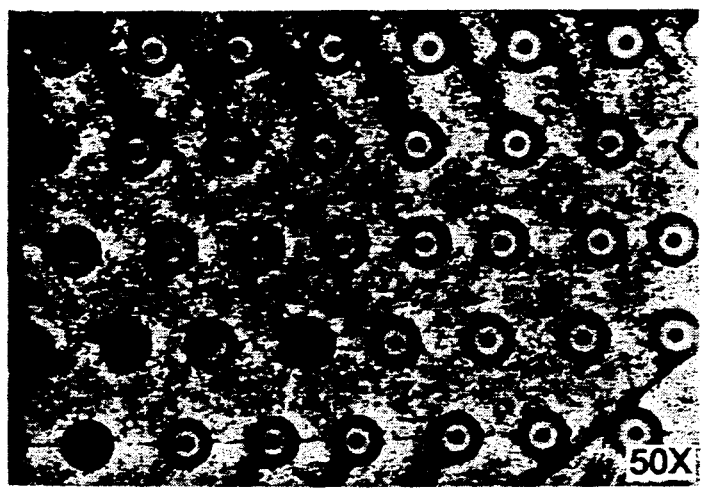
FIG. 1 is a photomicrograph showing a typical cross section of a SiC fiber/BAS glass-ceramic matrix composite material produced in accordance with the present invention showing the uniform fiber distribution.

The composite of the present invention is produced by first preparing an aqueous slurry of glass powder along with a fugitive organic binder, plasticizer, glycerine, and surfactant. Glass powders having an average particle size of about 2.5 µm have been satisfactory. A binder identified as Methocel 20-214 which is a commercially available material from the Dow Chemical Company has been suitable. A plasticizer known commercially as Polyglycol E-400 from the Dow Chemical Company has been adequate. A surfactant material sold commercially as Tritonex 100 has provided satisfactory results.

Celsian seeds are synthesized by heat treatment of the BAS glass powder (of composition 40.9 w/o BaO, 27.1 w/o $Al_2O_3$, and 32.0 w/o $SiO_2$) at 1250° C. for three days. The resulting material is then ground.

This heat treatment and grinding is repeated until X-ray diffraction analysis shows the presence of only the monoclinic celsian phase and complete absence of the hexacelsian phase. Typically, this is achieved after three heat treatment cycles. After this, the material is ground and passed through a 325 mesh screen. The −325 mesh celsian powder is used as seeds during processing of the silicon carbide fiber-reinforced celsian glass-ceramic matrix composites.

The aqueous slurry is ball milled at which time 10-20 weight percent of the −325 mesh celsian seeds are added. This is required for the crystallization of monoclinic celsian, rather than hexacelsian, in the glass ceramic matrix. Hexacelsian formation is detrimental because of its high thermal expansion and a reversible structural phase transformation at 300° C. which is accompanied by a large volume change. Celsian formation in the glass-ceramic matrix can also be facilitated by substituting 5 to 10 weight percent of BaO by SrO in the glass batch during melting prior to forming the glass powders.

The resulting slurry is cast into tapes. This may be facilitated by using a doctor blade. After the tape has dried, it is cut to size. The composition of the matrix is preferably 40.9 w/o BaO, 27.1 w/o $Al_2O_3$ and 32.0 w/o SiO₂. This composition is also expressed as 25 mole % BaO, 25 mole % Al₂O₃, and 50 mole % SiO₂.

Continuous CVD SiC fibers that were supplied by Textron Specialty Materials are wound onto a drum. Commercially available adhesive tape is used to hold the fibers in their proper position on the drum. The fibers are then cut into unidirectional mats of desired predetermined size whose fiber orientation and integrity are maintained by the adhesive tape.

The required number of matrix tapes and fiber mats are alternately stacked in a desired orientation in a warm press die. After stacking, this material is warm pressed to produce a "green" composite.

The "green" composite is then removed from the warm press die and wrapped in either graphite foil or molybdenum foil. The wrapped "green" composite is loaded into a hot pressing die where it is heated to an elevated temperature between about 400° C. to 500° C. to burn out organic constituents to produce an interim material.

The interim material is then hot pressed under vacuum using temperatures of 1250° C.–1500° C., a pressure of 2 to 4 KSI, and a time of 15 to 120 minutes. After cooling to room temperature and pressures, the resulting composites are then removed from the die.

A number of the composites were cut into test bars for flexural strength measurements and other characterizations. FIG. 1 is a 50X photomicrograph showing a typical cross section of a SiC fiber/BAS glass-ceramic matrix composite material produced in accordance with the present invention. This figure clearly shows the uniform fiber distribution.

Figure 2:
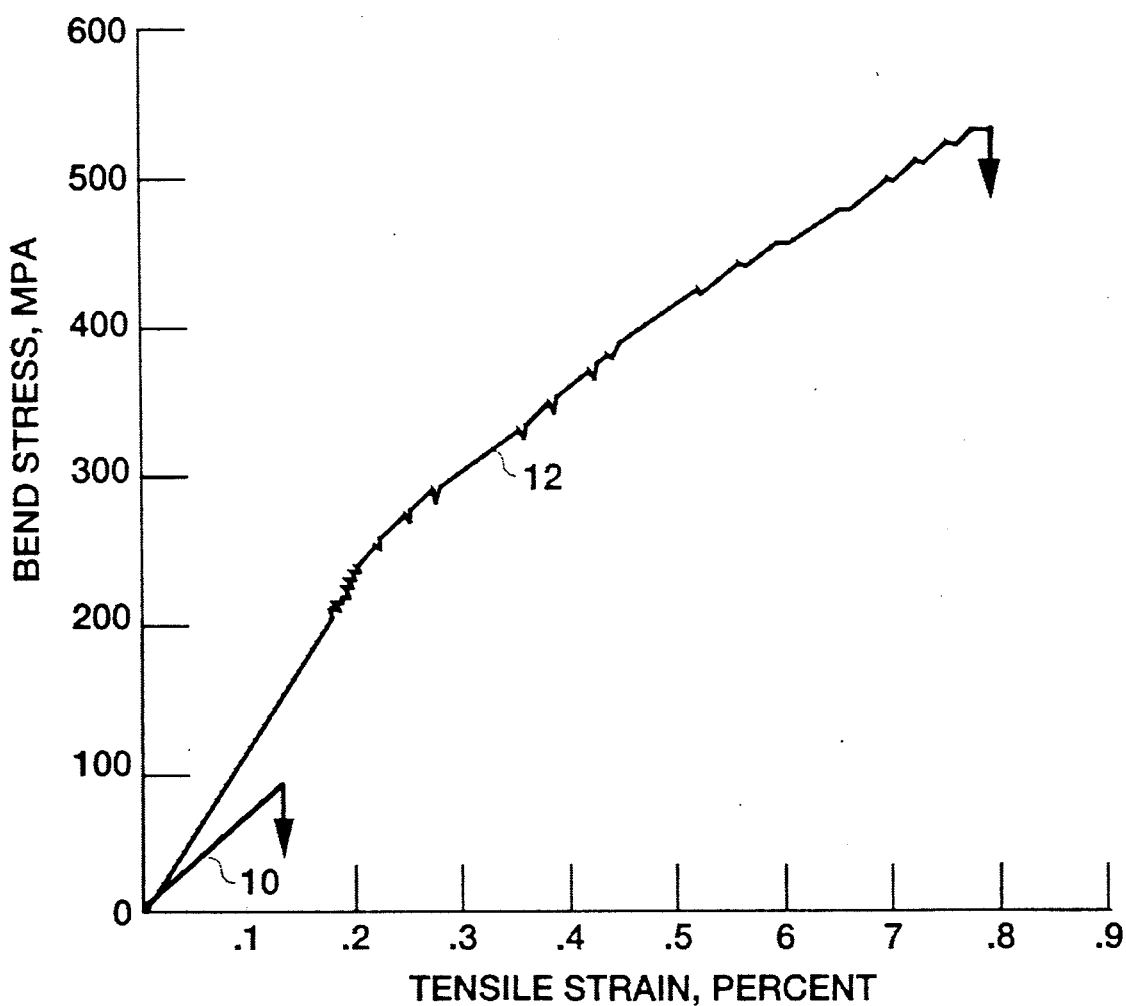
FIG. 2 is a graph comparing the three point flexural stress-strain behavior for a hot pressed BAS monolithic and for a 22 fiber volume percent silicon carbide fiber/BAS glass-ceramic matrix composite material at room temperature.

Referring to FIG. 2 there is shown a graph of the 3-point flexural stress-strain behavior for a hot pressed monolithic BAS as illustrated by the line 10. The 3-point flexural stress-strain behavior for a 22 volume percent SiC fiber/BAS glass ceramic matrix composite material is illustrated by the line 12. Both flexural stress-strain lines are for room temperature measurements. FIG. 2 illustrates unidirectional composites having room temperature 3-point flexural stress of greater than 540 MPA have been fabricated with 22 volume percent fiber loading.

While the preferred embodiment of the invention has been shown and described, it will be appreciated that various modifications may be made to the invention without departing from the spirit thereof or the scope of the subjoined claims. This silicon carbide fiber-reinforced BAS glass-ceramic matrix having a monoclinic celsian phase is a new and improved structural material. The composite fabricated by the aforementioned method has mechanical properties superior to existing materials and a potential for use at temperatures as high as 1450° C. to 1500° C.

What is claimed:

1. A method of producing a ceramic fiber-reinforced glass-ceramic matrix composite comprising the steps of
preparing an aqueous slurry of BaO—Al₂O₃—2SiO₂ (BAS) glass powder, an organic binder, a plasticizer, glycerine, and a surfactant,
forming celsian seeds separate from said slurry,
ball milling said slurry,
adding said celsian seeds to said slurry during said ball milling,
casting said slurry into tape thereby forming a glass-matrix tape,
drying said glass matrix tape,
cutting said glass matrix tape,
winding continuous chemical vapor deposition (CVD) SiC fibers onto a drum,
cutting said fibers on said drum thereby forming a fiber mat,
alternating a plurality of said glass matrix tapes with a plurality of said fiber mats thereby forming a tape-mat stack,
warm pressing said tape-mat stack thereby forming a "green" composite,
wrapping said "green" composite in foil,
heating said wrapped "green" composite whereby organic constituents are burned out thereby forming an interim material, and
hot pressing said interim material to produce a silicon carbide fiber-reinforced celsian glass-ceramic matrix composite wherein said celsian seeds insure crystallization of monoclinic celsian in said composite.

2. A method as claimed in claim 1 wherein the (BAS) glass powder has an average particle size of about 2.5 μm.

3. A method as claimed in claim 1 wherein the plasticizer in the slurry is polyglycol.

4. A method as claimed in claim 1 wherein the celsian seeds are synthesized by heating BAS glass powder at 1250° C. for three days.

5. A method as claimed in claim 4 wherein the composition of the celsian seeds is 40.9 w/o BaO, 27.1 w/o Al₂O₃, and 32.0 w/o SiO₂.

6. A method as claimed in claim 5 wherein the celsian seeds are heated for three cycles so that only monoclinic celsian phase is present therein.

7. A method as claimed in claim 6 wherein the monoclinic celsian glass is ground after the heating for three cycles.

8. A method as claimed in claim 7 wherein the ground monoclinic celsian glass is passed through a 325 mesh screen to form −325 mesh celsian powder thereby producing celsian seeds.

9. A method as claimed in claim 1 wherein between about 10 weight percent and about 20 weight percent celsian seeds are added to the slurry during ball milling.

10. A method as claimed in claim 1 wherein the SiC fiber comprises about 22 volume percent of the composite.

11. A method as claimed in claim 1 wherein the "green" composite is wrapped in graphite foil.

12. A method as claimed in claim 1 wherein the "green" composite is wrapped in molybdenum foil.

13. A method as claimed in claim 1 wherein said "green" composite is hot pressed at a temperature between about 1250° C. and about 1500° C.

14. A method as claimed in claim 13 wherein the hot pressing occurs at a pressure between about 2 KSI and about 4 KSI.

15. A method as claimed in claim 14 wherein said hot pressing occurs at a time between about 15 minutes and about 120 minutes.

16. A method as claimed in claim 1 wherein about 5 w/o to about 10 w/o of SrO is substituted for BaO in the glass forming the powder to facilitate the celsian formation in the glass-ceramic batch.

17. In a method of forming a silicon carbide fiber-reinforced celsian glass-ceramic matrix composite the steps of
alternating a glass matrix tape composed of about 40.9w/o BaO, about 27.1w/o Al₂O₂, and about 32w/o SiO₂, an organic binder, a plasticizer, glycerine, surfactant, and celsian seeds having a composition of 40.9w/o BaO, 27.1w/o $Al_2O_3$ and 32.0w/o $SiO_2$ with about 20% to about 40% by volume of a fiber mat comprising silicon carbide fibers thereby forming a tape-mat stack, warm pressing said stack, thereby forming a "green" composite, heating said "green" composite, thereby burning out organic material therefrom, hot pressing the resulting material at a temperature of about 1200° to about 1500° C. for about 15 minutes to about 120 minutes at a pressure of about 2KSI to about 4KSI, thereby producing a silicon carbide fiber reinforced celsian glass-ceramic matrix composite, and cooling said composite to room temperature.

18. A method as claimed in claim 17 wherein the plasticizer is polyglycol.

19. A method as claimed in claim 17 wherein the glass matrix tape contains between about 10 weight percent and about 20 weight percent fine celsian seeds.

20. A method as claimed in claim 17 wherein the composite comprises about 22 volume percent SiC fibers.

* * * * *